United States Patent [19]

St. Angelo, Jr. et al.

[11] Patent Number: 5,067,225

[45] Date of Patent: Nov. 26, 1991

[54] METHOD OF A ROBOT FOR INSTALLING WEATHER STRIPPING IN A DOOR OR LIKE OPENING

[75] Inventors: Stephen St. Angelo, Jr., Rochester Hills; John J. Lucci, Lansing, both of Mich.; George C. Carver, Albany, Ga.; Alan Heads, New Market; James F. Mitchell, Oshawa, both of Canada

[73] Assignee: General Motors Corporation, Detroit, Mich.

[21] Appl. No.: 666,176

[22] Filed: Mar. 7, 1991

Related U.S. Application Data

[62] Division of Ser. No. 285,989, Dec. 19, 1988, abandoned.

[51] Int. Cl.$^5$ .................. B23P 21/00; B23Q 15/00
[52] U.S. Cl. ................................ 29/451; 29/235
[58] Field of Search ............... 29/450, 451, 235, 417, 29/701; 198/428, 617; 414/744 A, 225, 786; 901/41, 36, 31, 37, 26

[56] References Cited

U.S. PATENT DOCUMENTS

| | | | |
|---|---|---|---|
| 4,620,354 | 11/1986 | Hess et al. | 29/451 X |
| 4,715,110 | 12/1982 | St. Angelo et al. | 29/451 X |
| 4,760,636 | 8/1988 | St. Angelo, Jr. et al. | 29/451 X |
| 4,839,958 | 6/1989 | St. Angelo, Jr. et al. | 29/430 X |
| 4,897,913 | 2/1990 | St. Angelo, Jr. et al. | 29/430 X |

Primary Examiner—Timothy V. Eley
Attorney, Agent, or Firm—Ernest E. Helms

[57] ABSTRACT

The field of the present invention is that of an apparatus and method of installing weather stripping in a door and like openings using a robot. The field of the present invention is also that of an end of arm tooling device (EOAT) for a robot which installs weather stripping in a door and like openings.

2 Claims, 5 Drawing Sheets

METHOD OF A ROBOT FOR INSTALLING WEATHER STRIPPING IN A DOOR OR LIKE OPENING

This is a division of application Ser. No. 07/285989 filed on Dec. 19, 1988, now abandoned.

FIELD OF THE PRESENT INVENTION

The field of the present invention is that of an apparatus and method of installing weather stripping in a door and like openings using a robot. The field of the present invention is also that of an end of arm tooling device (EOAT) for a robot which installs weather stripping in a door and like openings.

Excellent examples of robotic weather stripping systems are shown and described in the U.S. Pat. Nos. 4,715,110; 4,760,636; and 4,780,943 to St. Angelo et al. The present invention provides various improvements to the robotic weather stripping system apparatus and methods described in the aforementioned patents and the disclosure of the aforementioned patents are incorporated herein.

SUMMARY OF THE INVENTION

The present invention provides an apparatus and method of utilization of the same of a robot for installation of weather stripping in a body or like opening. The present invention also provides an EOAT for use on the robot above-described.

It is an object of the present invention to provide an EOAT for a robot which can install weather stripping into the opening of a vehicle or like body. It is another object of the present invention to provide a method for installing weather stripping within a body door or like opening.

It is an object of the present invention to provide an end of arm tool (EOAT) for a robot used for installing a loop of weather stripping int a body opening, the EOAT including a frame, fork means having two fingers mounted to the frame for laterally surrounding and bracketing the weather strip, a guide roller rotatably mounted to the frame having a first position engaged with the loop to align the weather stripping and the guide roller having a second position out of engagement with the loop, an idler roller receiving the loop from the fork means mounted on the frame for supporting the loop generally opposite the guide roller in the first position of the guide roller, and a pressure roller rotatively mounted on the frame for receiving the loop from the guide roller and guiding the loop and tracing the opening of the body whereby the loop is affixed to the opening of the body.

It is an object of the present invention to provide a method for utilizing a robot with an arm having an idler roller for supporting a fixed length of weather stripping, a guide roller having a first position engaged with the weather strip opposite the idler roller and a second nonengaged position, a fork and a pressure roller to install the fixed length of weather stripping into a body opening, the method including bracketing the fixed length by surrounding the fixed length with the fork, engaging the fixed length with the guide roller opposite the pressure roller aligning the fixed length with the pressure roller, and interacting the pressure roller with the opening whereby the fixed length is guided and affixed with the opening of the body.

It is an object of the present invention to provide an EOAT for a robot used for installing a loop of weather stripping with a U-shaped carrier with interior barbs and inboard and an outboard legs, both of the legs having outer surfaces into a body opening, the EOAT including a frame, a guide roller rotatably mounted to the frame having a first position engaged with the loop to align the weather stripping and the guide roller having a second position out of engagement with the loop, the guide roller having a major transverse dimension for projection within the carrier with a taper on both sides of the major dimension contacting the barbs and to transversely align the weather stripping and wherein the guide roller does not touch the outer leg surfaces of the carrier, an idler roller mounted on the frame for supporting the loop generally opposite the guide roller in the first position of the guide roller, and a pressure roller rotatively mounted on the frame for receiving the loop from the guide roller and guiding the loop and tracing the opening of the body whereby the loop is affixed to the open of the body.

It is an object of the present invention to provide a method of utilizing a robot with an arm having an idler roller for supporting a fixed length of weather stripping having an angled corner, a guide roller having a first position engaged with the weather strip opposite of the idler roller and a second position nonengaged with the fixed, and a pressure roller to install the fixed length of weather stripping into a body opening with an angled corner, the method including engaging the fixed length with the guide roller opposite the pressure roller aligning the fixed length with the pressure roller, and tucking the angled corner of the fixed length into the angled corner of the body thereby opening seating the weather strip into the corner, and interacting the pressure roller with the remainder of the opening whereby the fixed length is guided and of fixed with the remainder of the opening of the body.

It is an object of the present invention to provide an EOAT for a robot used for installing a loop of weather stripping into a body opening, the EOAT including a frame, a guide roller rotatably mounted to the frame having a first position engaged with the loop to align the weather stripping and the guide roller having a second position out of engagement with the loop, an idler roller mounted on the frame for supporting the loop generally opposite the guide roller in the first position of the guide roller, and a pressure roller rotatably mounted on the frame along a first axis being spring biased on both sides of the first axis and the pressure roller being provided for receiving the loop from the guide roller and guiding the loop and tracing the opening of the body whereby the loop is affixed to the opening of the body.

It is an object of the present invention to provide an EOAT for a robot used for installing a loop of weather stripping having a carrier transversely connected with a bulb into a body opening, the EOAT including a frame, a guide roller rotatably mounted to the frame having a first position engaged with the loop to align the weather stripping and the guide roller having a second position out of engagement with the loop, an idler roller mounted to the frame for supporting the loop generally opposite the guide roller in the first position of the guide roller, and a pressure roller rotatably mounted on the frame for receiving the loop from the guide roller and guiding the loop and tracing the opening of the body whereby the loop is affixed to the opening of the body, wherein the pressure roller is contoured to mate with the carrier of the weather stripping and to avoid contact with the bulb of the weather stripping when guiding the loop and tracing the opening of the body.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
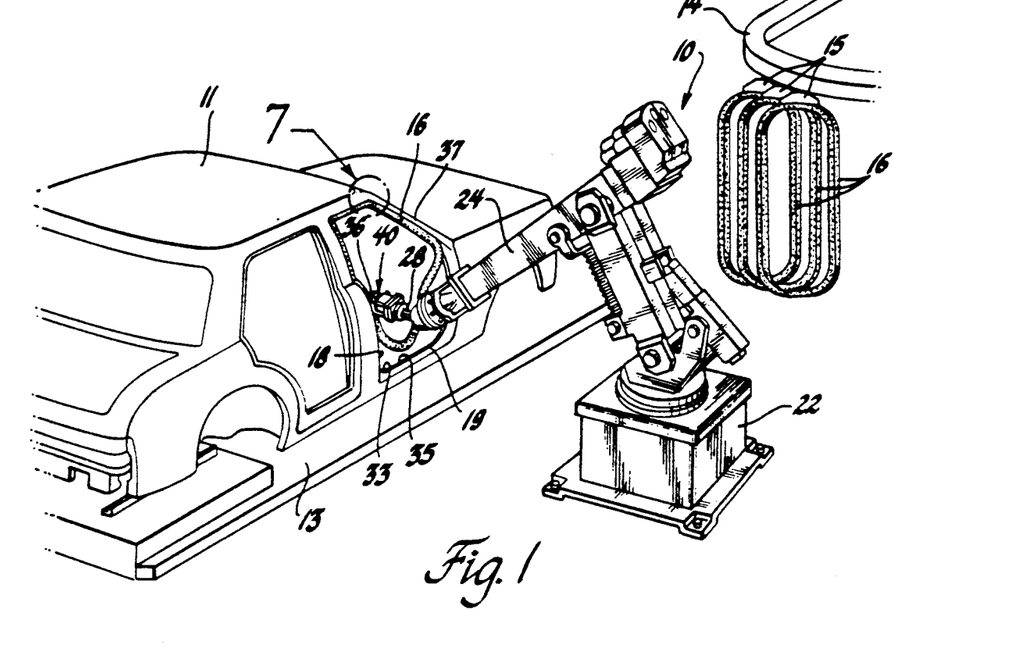
FIG. 1 is a perspective view of the robot of the present invention in a factory environment.

Referring to FIG. 1, a six axes robot 10 is located adjacent the side of the vehicle body 11. The vehicle 11 is moved along on a conveyor line or by an automatic guided vehicle 13. A weather stripping loading station is provided by carousel or conveyor line 14 adjacent to the robot 10. The conveyor line 14 carries a series of presentation fixtures or hangers 15 on which are stored two separate fixed length closed loops of weather stripping 16 (only one loop per hanger is shown for clarity of illustration). The robot 10 as will be described later will load the weather stripping 16 from the conveyor line 14 and then transfer the weather stripping to the vehicle 11. The robot 10 will then install the weather stripping 16 by interacting the vehicle door opening 18 to affix the weather stripping 16 therein.

The robot 10 is supported on a pedestal 22 and has an arm 24 movable in both horizontal and vertical planes for universal movement. At the end of the arm 24 is an EOAT device 40 which allows the robot 10 to pick up the weather stripping 16 and to affix the same to the opening 18.

Figure 2:
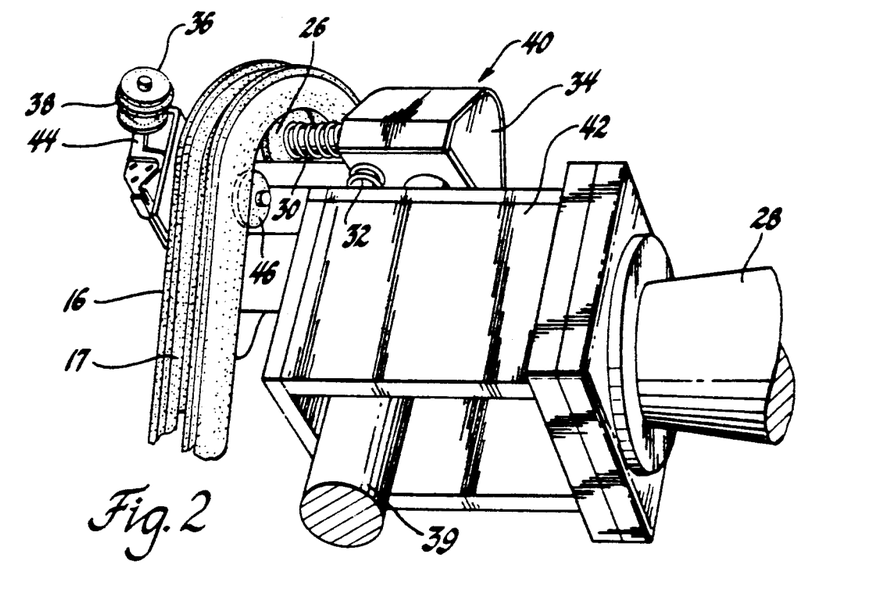
FIGS. 2, 3 and 4 are partial perspective views of the EOAT of the robot of the present invention loading the weather stripping from the loading station.
Figures 3, 4:
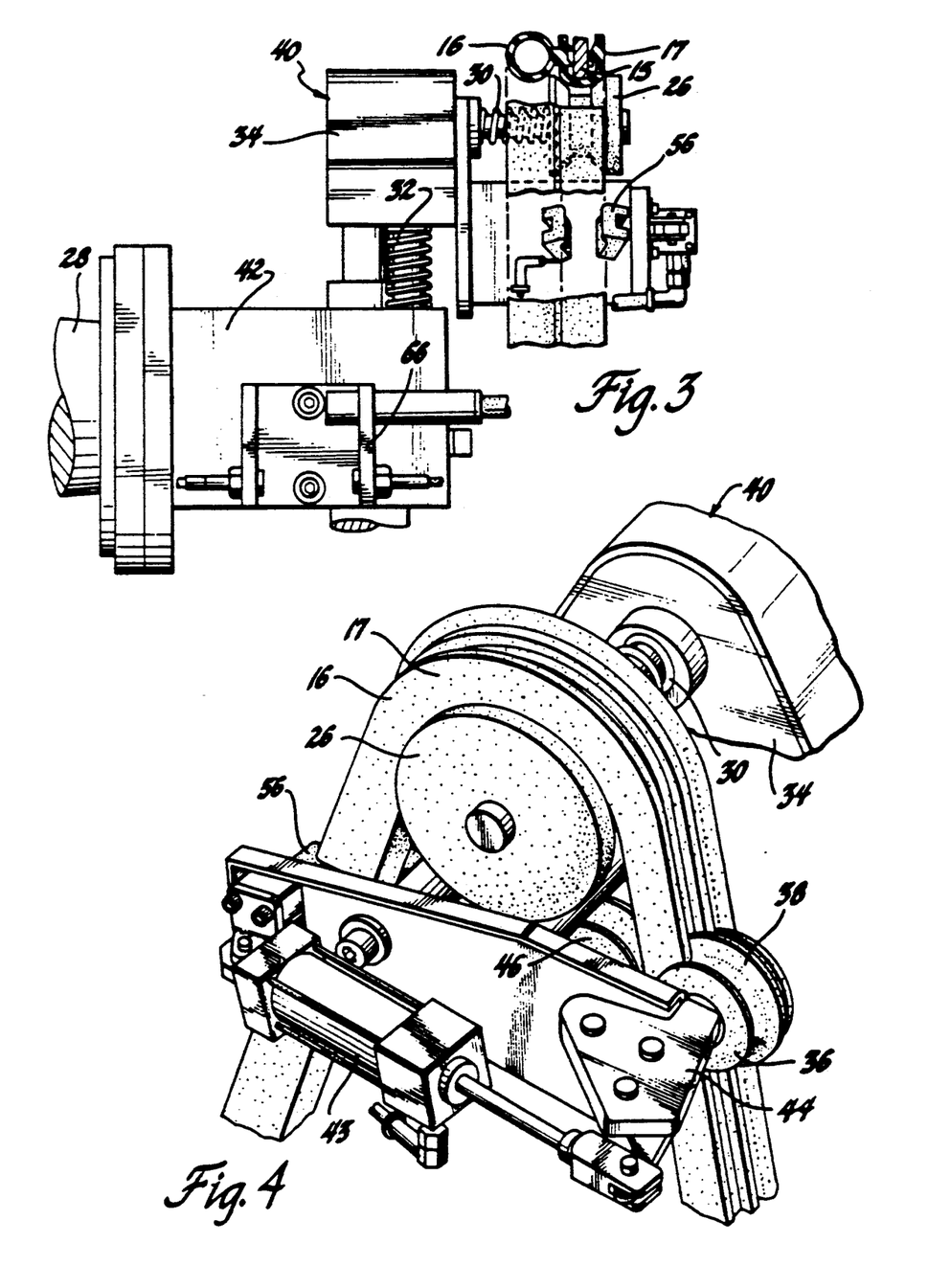
Figures 5, 6, 7:
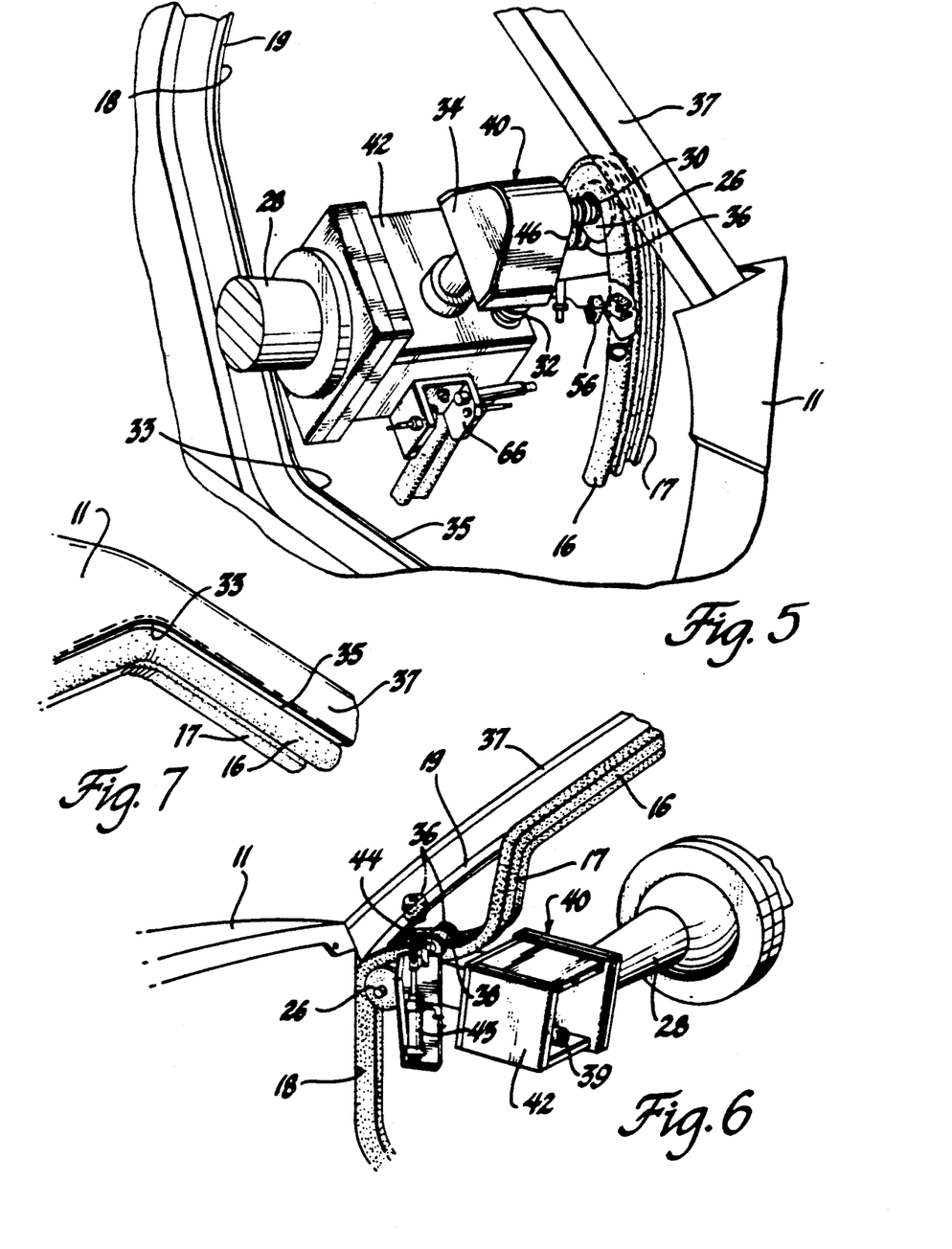
FIG. 5 is a perspective view illustrating the robot installing the weather stripping within the vehicle door opening during the initial stages of installation.
FIG. 6 is a perspective view illustrating the robot installing the weather stripping in the vehicle door opening towards the end of the installation.
FIG. 7 is an enlarged view of the area encircled in FIG. 1

Referring to FIGS. 2, 3 and 4 the EOAT frame 42 has rotatably mounted thereon a pressure roller 26. The pressure roller 26 provides the means to guide and seat the weather stripping 16 to affix the weather stripping 16 to the vehicle opening 18. The pressure roller is powered for rotation and is provided with compliance in two perpendicular axes with respect to the robot arm 24 by springs 30 and 32. The compliance is provided to allow for adjustments in the location of vehicle 11, the location of the openings 18, and the location of the opening flange 19 (FIGS. 5 and 6). Also, the pressure roller 26 has a clutch 34 providing it with variable rotational velocity. The variable rotational velocity allows the robot 10 via the pressure roller 26 to trace the vehicle opening 18 at a faster rate along the straight sections such as section 35 (FIG. 5) and at a slower rate along the corners or curve like section 33 (FIG. 5).

To align the weather stripping 16 with the pressure roller 26 there is provided a guide roller 36. The guide roller 36 is also rotatably mounted to the EOAT frame 42. The guide roller 36 has a first position wherein it has a center blade 38 engaged with the weather stripping 16 opposite the pressure roller 26. EOAT 40 has an air cylinder 43 and a pivotally connected lever 44 (FIG. 4) to translate the guide roller 36 to a second position out of engagement with weather stripping 16. (FIGS. 2 and 6 in phantom). The second position is provided to allow loading of the weather stripping 16 to the robot 10 or to release the weather stripping 16 (FIG. 6 phantom) during the final stages of installation.

Opposite the weather stripping 16 from the guide roller 36 is an idler roller 46 which is rotatively mounted to the EOAT frame 42. The function of the idler roller 46 is to cooperate with guide roller 36 in alignment of the weather stripping 16 with the pressure roller 26.

The EOAT 40 has a means to load the arm 24 with weather stripping 16 from conveyer 14 provided by a selectively operable gripper 56. The gripper 56 allows the robot 10 to grab the weather stripping 16 from conveyor 14 and transfer the weather stripping 16 to the opening 18.

In operation, the hangers 15 are loaded with weather stripping 16 manually or by a machine by placing the U-shaped portion of the weather stripping (commonly referred to as the carrier) onto the hanger. The robot 10 positions the EOAT 40 in the proximity of the conveyor line 14. A sensor, not shown, located on the conveyor line 1 determines if a ring of weather stripping 16 is present on the hanger 15 and signals the robot's controller the location of weather stripping 16. After receiving the signal of the presence and location of the weather stripping 16, the robot 10 then positions the pressure roller 26 vertically upwards to contact the weather stripping 16 FIG. 3, note portions of hanger 15 are deleted for clarity of illustration) with the carrier 17 of the weather stripping 16 away from the robot wrist 28. The EOAT is then rotated via the wrist 28 to allow the gripper 56 to grab the weather stripping 16. EOAT 40 is then rotated in the opposite direction (FIG. 2, hanger 15 deleted for clarity of illustration) to bring the idler roller 46 into contact with the weather stripping 16. An air cylinder 43 then activates the lever 44 (FIG. 4 with hanger 15 deleted for clarity of illustration), translating the guide roller 36 to a position of engagement with the weather stripping 16. Robot 10 then moves EOAT 40 away from the hanger 15 thereby completing the loading of the arm 24. If desired, the sequence of operation of the grippers 56 grabbing weather stripping 16 and the guide roller 36 moving from its second to first position can be reversed in the loading of the weather stripping 16 to the arm 24.

Robot 10 then transfers the weather stripping 16 towards the opening 18 (FIG. 5). Robot 10 first positions the EOAT 40 in such a position that the EOAT mounted sensor 66 can confirm the location of the opening 18. Also the gripper 56 will now be actuated to release the weather stripping 16.

Installation may start anywhere, however it is preferable to start on the A pillar 37 of the opening 18 and then proceed in an upward direction. Robot 10, via the arm 24 and the wrist 28 will then cause the pressure roller 26 to trace the inner periphery of the door opening 18 along the flange 19, guiding and affixing the carrier 17 of the weather stripping to the flange 19 of the opening 18. Robot 10 may be programmed to move at a faster pace along the straight sections 35 and at a slower pace along the corner 33 to insure an even installation of the weather stripping 16. As mentioned previously, the rotational speed of the pressure roller 26 will be varied to provide for the changes in the linear installation speed. The rotational speed of the pressure roller 26 can be modified by selectively engaging or disengaging the pressure roller 26 from a motor 39 powering the pressure roller. When installing oversized fixed lengths it has been found to be advantageous to allow the pressure roller 26 to free wheel along the straight sections 35. Therefore the rotational speed of the pressure roller 26 will largely be a function of the linear speed of the robot 10 (via EOAT 40). As the EOAT 40 approaches the corner 33, the EOAT linear speed slows down. Clutch 34 now engages pressure roller 26 with its powered motor 39 and the pressure roller 26 obtains a rotational speed even greater than its rotational speed along the straight section 35. The slower linear speed of EOAT 40 and the higher rotational speed of pressure roller 26 causes the weather stripping 16 to be selectively applied and affixed to the corner section 33 (FIG. 7) in a linearly compressed manner. Therefore the slack in the weather stripping 16 is taken up where it is needed most, in the corner section 33. After leaving the corner, clutch 34 again disengages and pressure roller 26 again free wheels along the next straight section 35 EOAT 40 linear speed will return to its higher state.

It has been found that longitudinal compression of weather stripping 16 is a function of the relative velocity of a point on the periphery of the pressure roller 26 in relationship to a point on body opening 18. Therefore the longitudinal compression of weather stripping 18 is also function of the rotational velocity of pressure roller 26. Generally, an increase in the rotational velocity of pressure roller 26 causes an increase in the longitudinal compression of weather strip 16.

As the installation near completion (FIG. 6), the guide roller 36 will be translated to its second position (phantom) to prevent it from pulling away the prior installed weather stripping 16. The installation can now be completed as the pressure roller 26 moves up the A pillar 37. The robot 10 will now return to conveyor 14 to be reloaded and the next body opening or vehicle opening is brought into place.

Figure 9:
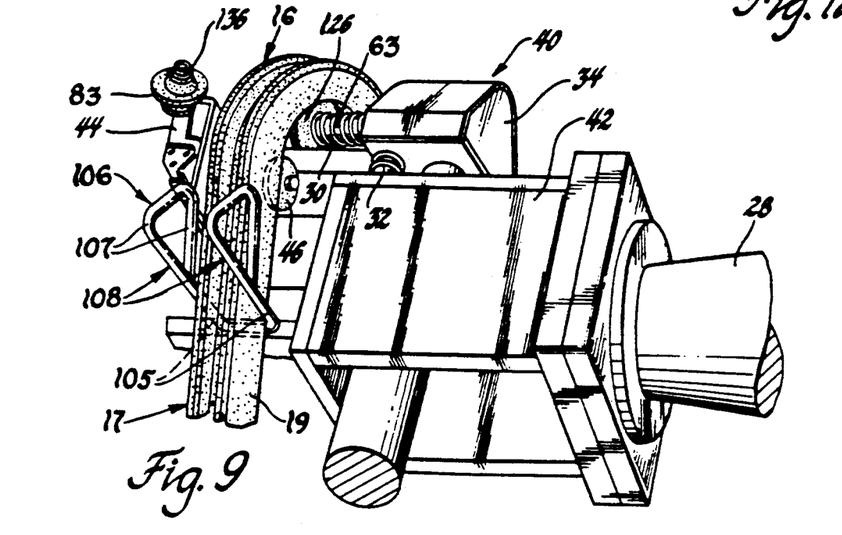
FIG. 9 is a perspective view similar to that of FIG. 2 of an EOAT with a fork means.

Referring additionally to FIG. 9, the end of arm tool 40 has a fork means 106 having two fingers 108 which are mounted to the frame 42. The fork 106 will laterally surround the weather stripping 16 and bracket the same. As shown in FIG. 7, the portion 105 of the fingers 108 most adjacent to the frame 42 are closer together to each other than the portion 107 of the fingers 108 furtherest away from frame 42 thereby providing a slight taper. The distance between the fork fingers 108 should be slightly greater than the lateral distance of the weather stripping carrier 17 and bulb 19 and be nonbinding on the weather stripping. However, the distance should not be of a magnitude such that the weather stripping 16 can rotate along its length (longitudinal). In operation the fork 106 is most critical in two separate instances. When the weather strip is suspended from a structure by the carrier 17, the robot 7 can manipulate the EOAT frame 42 such that the frame 42 will rotate upon the robotic arm 24 and nest the suspended weather stripping 16 between the figure fingers 108. The fork 106 will bracket the weather stripping 16 to help present the weather stripping 16 to the idler roller 46 allowing the idler roller 46 to receive weather stripping 16 which is aligned therewith.

Typically, the weather stripping utilized (shown in the greatest detail in FIG. 12) has what is a carrier 17 is U-shaped having an outboard 120 and inboard 121 legs with interior barbs 130. The bottom 137 of the U-shaped carrier section is usually reinforced with fiber and/or a steel band or wire. The legs 120 and 121 are also reinforced. Transversely joined the carrier 17 is to a hollow tube section typically referred to as the bulb 19 which is mounted in a outboard position in the vehicle opening 18. Due to the cross-sectional shape of the weather stripping 16 and also to the weight provided by the metal reinforcement the weather stripping has 16 a center of gravity more closely adjacent to the bottom portion 137 (closed end) of the U-shape carrier than to the open end.

As the robot arm 28 proceeds toward installation of the upper portion of the door opening 18, the bottom portion 137 end of the weather stripping carrier will be below the open end, therefore the center of gravity of the weather stripping looking will be pulled toward the idler 46 and pressure rollers 26. When installation occurs towards the lower portions of the opening 18 the center of gravity of the weather stripping will be above the open portion of the carrier 17. The weather stripping can sometime exhibit a tendency to be susceptible to an imbalance situation and therefore twist along its longitudinal axis (also the center of gravity of the weather stripping is now being pulled by gravity away from the idler roller 46) causing it to fall or twist out of engagement from between the idler 46 and guide 136 rollers. By bracketing the weather stripping 16 with fork 18 especially in the lower portions of the opening 18 locations, the weather stripping 16 is retained in the proper orientation for presentation to the guide and idler 46 rollers, and installation is improved.

The distance of portion 107 of the fingers 108 from the idler roller 46 will be a function of the torsional rigidity of the weather stripping 16. The more rigid the weather stripping utilized the further portion 107 can be from the idler roller 46. A tool for measuring torsional rigidity is described in commonly assigned U.S. patent application Ser. No. 255,262. St. Angelo et al.

Figure 8A:
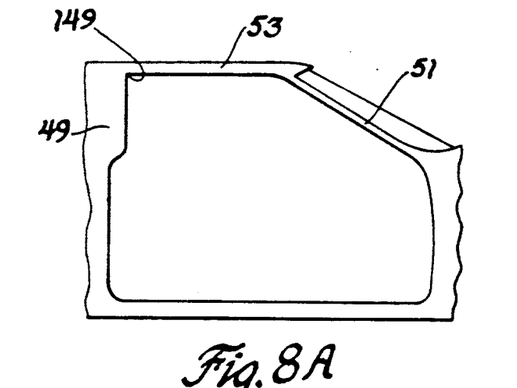
FIG. 8A is a side elevational with portions cut away of vehicle having an opening with an angle corner.
Figures 8B, 12:
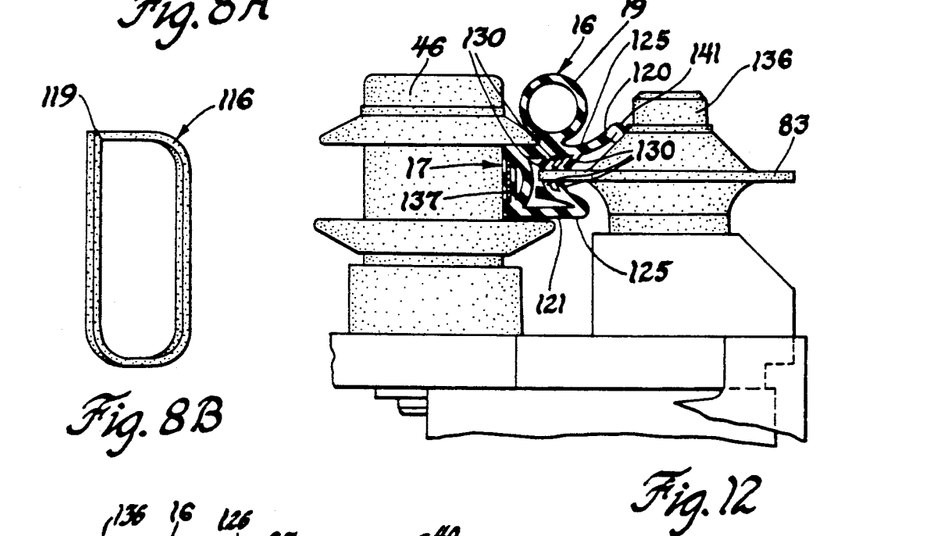
FIG. 8B is a perspective view of a weather strip for such an opening.
FIG. 12 is a side elevational view of the idler roller illustrated in FIG. 11.

FIG. 12 shows a cross section of an improved guide roller 136. The original guide roller shown as item 36 in FIG. 4 illustrates 3 lobes with a major lobe in the middle being tapered only on one side (inboard side during installation). The improved guide roller 136 shown in FIGS. 10 and 11 has a solitary major lobe 83 tapered on both sides. The guide roller 136 provides superior results for two major reasons. Firstly, the new guide roller 136 eliminates the two outer lobes, therefore, reducing undesirable rubbing action upon the inboard and outboard leg outer surfaces 125 of the carrier 17 during installation, therefore eliminating a possible variable which could effect installation of the weather stripping 16. Additionally, on certain occasions when pivoting the previous guide roller 36 into an engaged position with the weather stripping 16, one of the outer lobes would inadvertently be inserted within the carrier legs 120 or 121 providing an undesirable situation for installation. By providing the guide roller 136 with both sides being tapered, the guide roller 136 by contact the interior barbs of both carrier legs increasing the lateral stabilization of the carrier 17 (and weather stripping 16) during installation. Still another advantage is that the outboard taper of the guide roller 136 urges lip 141 of the weather stripping outward preventing damage to the lip 141 which is usually a softer rubber than the remainder of the leg 120.

Figures 10, 11:
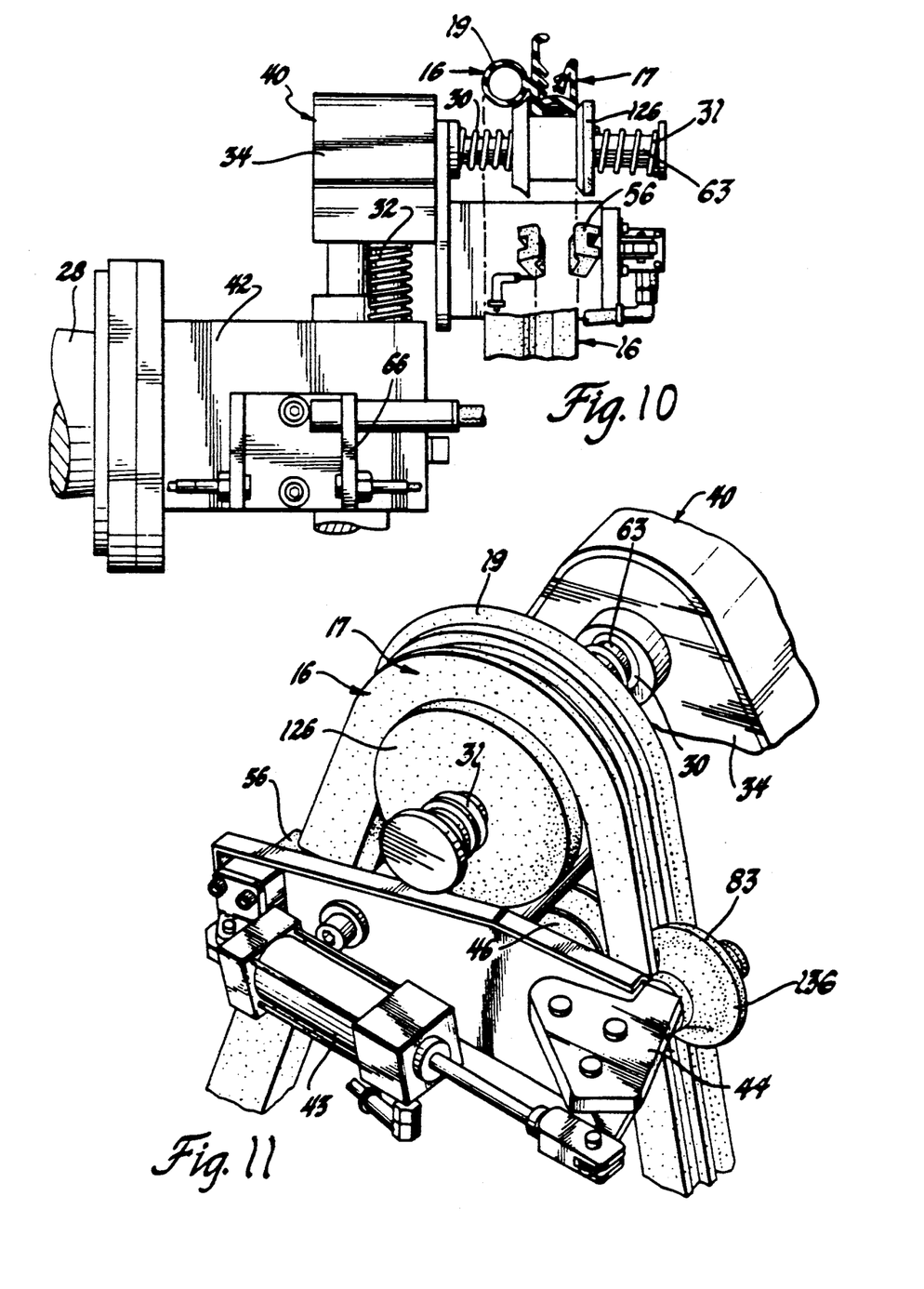
FIG. 10 is a side elevational view of an EOAT with an alternative pressure roller.
FIG. 11 is a perspective view similar to that of FIG. 4 with an alternative guide roller.

Referring additionally to FIG. 10 the EOAT 40 of the present invention is provided with an improved pressure roller 126 and means of biasing the pressure roller along the axis of rotation (first axis) of the pressure roller 126. Allowing compliance on both side of the pressure roller, by spring 30 and 31 provides significant unforeseen advantages. Prior to the modification as shown in FIG. 9 compliance was all upon one side of the pressure roller shaft 37 typically towards the outside towards the robot arm 26 (see FIG. 3). This is the conventional method as promulgated by most robotic texts. Therefore, to set up such of the compliance (along shaft 63) the robot 7 had to upon engagement of the previous pressure roller 26 into the vehicle opening 18 preload the pressure roller 26 along the rotation axis of the pressure roller 26 to provide for the compliance. The above procedure meant that movement the robot 28 not only had to accurately be programmed for the vehicle opening 18 along the projected vertical plane of the opening 18 but also that the programmed must be fairly accurate along the horizontal axis. (Since in many vehicles the top of the door opening is inboard of the bottom portion of the door opening.) Therefore, programming the arm travel path the robot 7 for a single vehicle opening 18, even utilizing a teach pennant would require three to four days. By allowing compliance on both sides of the pressure roller 126, the most critical point along the horizontal axis is upon initial engagement of the pressure roller 126 upon the vehicle opening 18, and thereafter compliance along the rotational axis of the pressure roller 126 is on either side. Therefore programming tolerance of the robotic arm 26 travel along an axis generally parallel with the axis of rotation of the pressure roller 126 is increased to the point that for programming purposes it can be ignored and the opening 18 can be assumed to be in a vertical plane. As a result programming time for a door opening can be reduced to as little as 3 hours.

Another advantage of the pressure roller 126 dual common axial spring biasing is that since preload is eliminated there is less friction. A greater benefit is realigned when the pinch weld flange of door opening is too short, (as measured radially). If the pinch weld is too short, a preload on the pressure roller can cause the pressure roller to shear the weather stripping 16 since there is not enough pinch weld to support the interior portion of the carrier 17. (Note: out of specification pinch welds can occur with improper fabrication or improper repair to a damaged pinch weld.) The same unfortunate event can occur when there is an excess of weather stripping longitudinally. The improved roller 126 will just roll over the excess weather stripping since it does not have the preloading.

Additionally, the guide roller 126 as shown in FIG. 10 is contoured such that upon application of the weather stripping 16 to the pinch wheel flange of the vehicle opening 18 the pressure roller 126 will not compress the bulb 19 of the weather stripping 16. Therefore, the bulb 19 of the weather stripping 16 is not strained in any manner during the application process and installation can be more consistent.

When stuffing the weather stripping 16 into a corner (FIG. 7) it is undesirable for the pressure roller to bind on the bulb 19. Bulb dimensional sizes fluctuate approximately 6% and load deflection of the bulb can fluctuate approximately 12%. Therefore, by eliminating possible contact with the bulb 19 with the pressure roller 126 greater consistency can be realized in stuffing of the weather stripping.

Many vehicle body openings have generally straight sections joined in a curvilinear fashion with another straight section. However, as will be apparent to those familiar with the automotive vehicle industry, there are certain vehicles which have vehicle openings (FIG. 7) especially along where a B pillar 49. (The pillar 49 is opposite the A pillar 51 and is typically the upright pillar in a sedan which separates the front and rear door openings.) For such applications it is not necessary to modify the end of arm tool 40 as originally disclosed in the aforementioned patents or herein, however, it is preferable to modify the method of application slightly, and also the weather stripping utilized is modified. The weather stripping 16 will be a loop having an angled corner 119 which is prejoined. Upon installation of the weather stripping 16, the robot 7 will tuck the weather stripping 16 into the corner 149 affixing the weather stripping into the corner 149 and will then continue on with installation as previously described.

The present invention is advantageous in that is allows the use of weather stripping with a carrier having a more narrow opening. Therefore the weather stripping will adhere to the flange of the vehicle body opening better. Narrow carrier openings make manual installation more difficult and therefore have been avoided in the past. The weather stripping 16 also has added a small piece of metal reinforcement in the end-to-end joint of the closed loop fixed length. Furthermore, it has been found that the weather stripping 16 works better when fabricated with a slightly more rigid elastomeric material than that normally used in the manual applications with a durometer rating held between 65-70 instead of the range of 60-70 allowed in the manual applications. However, even with all of the above noted modifications, the weather stripping 16 used in robotic application can still be used in manual installation systems.

The present invention is being described in regard to automotive vehicle body openings, however the various applications of the present invention extend beyond automotive vehicle body applications.

A few of the embodiments of the present invention been explained. However, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A method for utilizing a robot with an arm having an idler roller for supporting a fixed length of weather stripping, a guide roller having a first position for engagement with said fixed length of weather stripping opposite said idler roller and a second position for nonengagement with said fixed length of weather stripping, a fork and a pressure roller to install said fixed length of weather stripping into a body opening, said method in combination including:

bracketing said fixed length by surrounding said fixed length with said fork;

engaging said fixed length with said guide roller opposite said pressure roller thereby aligning said fixed length with said pressure roller; and     interacting said pressure roller with said opening whereby said fixed length is guided and affixed with said opening of said body.

2. A method of utilizing a robot with an arm having an idler roller for supporting a fixed length of weather stripping having an angled corner, a guide roller having a first position for engagement with said fixed length of weather stripping opposite of said idler roller and a second position or nonengagement with said fixed length of weather stripping, and a pressure roller to install said fixed length of weather stripping into a body opening with an angled corner, said method in combination comprising:

engaging said fixed length with said guide roller opposite said pressure roller thereby aligning said fixed length with said pressure roller;

and tucking said angled corner of said fixed length into said angled corner of said body thereby opening and seating said fixed length of weather stripping into said corner; and     interacting said pressure roller with the remainder of said opening whereby said fixed length of weather stripping is guided and affixed with the remainder of said opening of said body.

* * * * *

UNITED STATES PATENT AND TRADEMARK OFFICE
CERTIFICATE OF CORRECTION

PATENT NO. : 5,067,225

DATED : November 26, 1991

INVENTOR(S) : Stephen St. Angelo, Jr., John J. Lucci, George C. Carver, Alan Heads It is certified that error appears in the above-identified patent and that said Letters Patent is hereby corrected as shown below:

```
Title page, section [75], delete "James F. Mitchell,
           Oshawa, both of".

Title page, section [62], delete "abandoned" and insert
           -- now U.S. Patent No. 5,029,381 --.
```

Signed and Sealed this

Fifteenth Day of June, 1993

Attest:

MICHAEL K. KIRK

Attesting Officer

Acting Commissioner of Patents and Trademarks